United States Patent
Ao et al.

(10) Patent No.: US 8,971,175 B2
(45) Date of Patent: Mar. 3, 2015

(54) METHOD FOR IMPLEMENTING PROTECTION GROUP OVERLAY, AND METHOD AND SYSTEM FOR ETHERNET PROTECTION SWITCHING

(75) Inventors: Ting Ao, Shenzhen (CN); Yuehua Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 8 days.

(21) Appl. No.: 13/574,237

(22) PCT Filed: Dec. 14, 2010

(86) PCT No.: PCT/CN2010/079768
§ 371 (c)(1),
(2), (4) Date: Jul. 19, 2012

(87) PCT Pub. No.: WO2011/088713
PCT Pub. Date: Jul. 28, 2011

(65) Prior Publication Data
US 2012/0294141 A1    Nov. 22, 2012

(30) Foreign Application Priority Data
Jan. 21, 2010    (CN) .......................... 2010 1 0001658

(51) Int. Cl.
*H04L 12/24*    (2006.01)
*H04L 12/701*    (2013.01)
(Continued)

(52) U.S. Cl.
CPC ........ *H04L 41/0663* (2013.01); *H04L 41/0668* (2013.01); *H04L 45/00* (2013.01); *H04L 45/24* (2013.01); *H04L 1/22* (2013.01); *H04L 2001/0096* (2013.01)
USPC ....................................................... 370/218

(58) Field of Classification Search
CPC ....... H04J 3/0641; H04J 3/0688; H04J 3/085; H04L 1/0072; H04L 1/6302; H04B 10/032
USPC ....................................................... 370/218
See application file for complete search history.

(56) References Cited

U.S. PATENT DOCUMENTS

2008/0019264 A1 *   1/2008   Lafleur et al. ................. 370/217
2008/0044176 A1     2/2008   Zhao et al.
(Continued)

FOREIGN PATENT DOCUMENTS

| CN | 1661984 A | 8/2005 |
|----|-----------|--------|
| CN | 1825844 A | 8/2006 |

(Continued)

OTHER PUBLICATIONS

International Search Report mailed on Mar. 24, 2011 in PCT/CN2010/079768 in 4 pages.

*Primary Examiner* — Mark Rinehart
*Assistant Examiner* — Ellen A Kirillova
(74) *Attorney, Agent, or Firm* — Knobbe, Martens, Olson & Bear, LLP

(57) ABSTRACT

This disclosure discloses a method for implementing protection group overlay and a method for implementing Ethernet protection switching based on the protection group overlay. The method for implementing Ethernet protection switching based on the protection group overlay comprises: when the fault of TESI is detected by multiple IPG which protect the same TESI, only one IPG of the multiple nested IPGs performs protection switching. This disclosure further discloses a system for implementing Ethernet protection switching based on the protection group overlay, comprising a protection switching performing unit, configured to when a fault of a TESI is detected by multiple IPGs which protect the TESI, only one IPG of the multiple nested IPGs performing protection switching. Application of the method and system of this disclosure implements protection for key protected path through protection group overlay, and can achieve effects of saving network resource and increasing utilization rate of network resource.

8 Claims, 4 Drawing Sheets

(51) Int. Cl.
*H04L 12/707* (2013.01)
*H04L 1/22* (2006.01)
*H04L 1/00* (2006.01)

(56) References Cited

U.S. PATENT DOCUMENTS

2008/0205302 A1* 8/2008 Florit et al. ............... 370/255
2009/0285574 A1* 11/2009 Liu ............................ 398/2
2010/0135291 A1* 6/2010 Martin et al. ............. 370/389
2010/0260197 A1* 10/2010 Martin et al. ............. 370/408
2010/0309778 A1* 12/2010 Young ....................... 370/219

FOREIGN PATENT DOCUMENTS

CN 101599862 A 12/2009
WO WO2004/073251 A1 8/2004

* cited by examiner

METHOD FOR IMPLEMENTING PROTECTION GROUP OVERLAY, AND METHOD AND SYSTEM FOR ETHERNET PROTECTION SWITCHING

CROSS-REFERENCE TO RELATED APPLICATIONS

This application is the U.S. National Phase application under 35 U.S.C. §371 of International Application PCT/CN2010/079768, filed Dec. 14, 2010, which claims priority to Chinese Application 201010001658.6, filed Jan. 21, 2010.

FIELD OF THE INVENTION

This disclosure relates to the filed of data communication, and in particular to a method for implementing protection group overlay, and a method and a system for implementing Ethernet protection switching based on the protection group overlay.

BACKGROUND OF THE INVENTION

With the introduction of concept of the provider-level Ethernet, for enabling the Ethernet to meet the telecommunication-level standard, a higher requirement for protection and switching of the Ethernet is raised. In existing protection and switching technology supporting the Provider Backbone Bridge Traffic Engineering (PBB-TE) technology, the protection of Traffic Engineering Service Instance (TESI) is supported at present. That is an end-to-end tunnel protection. However, the end-to-end protection scheme not only requires longer time of protection and switching, but also involves too many nodes, which makes it impossible to implement protection of intermediate link and node. Thus, the PBB-TE segment protection is introduced. A protection segment is specially configured in a working segment of the PBB-TE tunnel to protect it. The working segment and the protection segment compose an Infrastructure Protection Group (IPG).

As shown in FIG. 1, there is one working segment and one or multiple protection segments in a protection group. In normal conditions, when there is no fault detected on the working segment, all traffics protected by the PBB-TE segment protection group are forwarded from the working segment. But, once there is fault occurring on the working segment, if Segment Edge Bridge (SEB) of the PBB-TE segment protection group, i.e., SEB1 and SEB2 shown in FIG. 1, can detect the fault in time, then the SEB will trigger update of a forwarding table. And the SEB will modify the egress port of the forwarding table corresponding to the TESI protected by the protection domain IPG, into the egress port corresponding to the protection segment on the SEB. Thereby, the traffic is switched to the protection segment, protection of the working segment is implemented, normal forwarding of network traffic is ensured, and network reliability is improved. The SEB described here can be either Backbone Edge Bridge (BEB) on the PBB-TE tunnel or Backbone Core Bridge (BCB) on the PBB-TE tunnel. The protection and switching technology has been established as a project in the IEEE standards organization, and the project number is 802.1Qbf. The project supports the PBB-TE segment protection of 1:1 as well as the PBB-TE segment protection of M:1, that is, a PBB-TE segment protection group of M:1 is composed of one working segment and M protection segments, wherein M is more than 1 and the working segment is protected by the M protection segments. The existing protection and switching technology can greatly improve system reliability.

FIG. 2 shows a diagram of PBB-TE segment and its fault detecting mechanism. In FIG. 2, both of the two endpoints SEB1 and SEB2 of the segment can specifically be the BEB or the BCB, and a Segment Intermediate Bridge (SIB) can specifically be BCB. All of Segment Endpoint Port (SEP) 1 on the SEB1, SEP2 on the SEB2, and Provider Network Port (PNP) including the SEP1 and the SEP2 are represented by ▩; and ▩ represents a Segment Intermediate Port (SIP).

The names involved in the related art are described below.

The member segment means the working segment or the protection segment of a protection group.

The working segment means the segment that traffic passes through in normal operation, as shown in FIG. 5.

The protection segment means the segment that bears the traffic after fault occurring on the working segment is detected or after a management command of switching is received and switching is performed, as shown in FIG. 5.

The segment means it is composed of a series of PNPs, and LAN and MAC relays among the PNPs, as shown in FIG. 5.

The SEB means two endpoints for ending segment, and the SEB can be either BEB device in the PBB-TE network or BCB device, as shown in FIG. 5. The bridge device in middle of a segment is SIB.

In FIG. 5, ▩ represents SEP, ▩ represents SIP, and both the SEP and the SIP are PNP; ▩▩▩ represents the working segment; ▩▩▩ represents the protection segment; □ represents bridge; ◂---▸ represents the TESI; two endpoints SEB of a segment can specifically be the BEB or the BCB; and the bridge device SIB can specifically be BCB.

The IPG traffic switching means that: if a previous group of TESI traffic protected by the IPG passes through the working segment, when performing the IPG traffic switching, the previous TESI traffic passing through the working segment is redirected to pass through the protection segment; or, if a previous group of TESI traffic protected by the IPG passes through the protection segment, when performing the IPG traffic switching, the previous TESI traffic passing through the protection segment is redirected to pass through the working segment. The redirecting described here is usually implemented by modifying the egress port of the items in the forwarding table corresponding to the TESI.

However, in many cases, it is not realistic to configure multiple protection segments for any one working segment for protection, for it may be limited by conditions, such as network resource. If it may be considered to protect a particularly important part of the path and protection for the key protected path is implemented through the protection group overlay, then effects of saving network resource and increasing the utilization rate of network resource can be achieved. But there is no implementation that can achieves these effects at present.

SUMMARY OF THE INVENTION

On that account, this disclosure mainly aims to provide a method for implementing protection group overlay, and a method and a system for implementing Ethernet protection switching, which implement protection for the key protected path through the protection group overlay, and can achieve effects of saving network resource and increasing the utilization rate of network resource.

For achieving the above object, the following technical solutions of this disclosure are provided.

A method for implementing protection group overlay is provided, which comprises using as nested protection groups multiple infrastructure protection groups (IPG) which protect a same traffic engineering service instance (TESI).

In this case, the method further comprises: enabling two SEPs of one IPG and SEPs or a SIP of another IPG to share a PNP.

A method for implementing Ethernet protection switching based on the protection group overlay is provided, which comprises: when a fault of a TESI is detected by multiple IPGs which protect the same TESI, only one IPG of the multiple overlayed IPGs performing protection switching, wherein the multiple IPGs are overlayed protection groups.

In this case, when the number of the multiple IPGs is two, they are IPG1 and IPG2 respectively, and the step of only one IPG performing protection switching comprises that: when protection switching happens in the IPG2, the IPG1 does not perform protection switching; or, when protection switching happens in the IPG1, the IPG2 does not perform protection switching.

In this case, the step of only one IPG performing protection switching further comprises that: when failure occur on both a working segment and a protection segment in the IPG2, or failure occurs on other part of member segments in the IPG1, the IPG1 performs protection switching, wherein the other part of the member segments in the IPG1 is a part of segments in the IPG1 which is not included in the IPG2.

In this case, when the number of the multiple IPGs is two, they are IPG1 and IPG2 respectively; and the step of only one IPG performing protection switching comprises: constructing an IPG3 to implement that there is only one IPG performing protection switching, wherein constructing the IPG3 comprises: using working segments of the IPG1 and working segments of the IPG2 as working segments of the IPG3, starting from a segment edge bridge (SEB) of the IPG1; using the working segments of the IPG1 and protection segments of the IPG2 as a protection segment 1 of the IPG3, starting from the SEB of the IPG1; and using protection segments of the IPG1 as a protection segment 2 of the IPG3.

A system for implementing Ethernet protection switching based on the protection group overlay is provided, which comprises a protection switching performing unit, configured to make only one IPG of the multiple nested IPGs perform protection switching when multiple IPGs which protect a same TESI detect a fault of the TESI, wherein the multiple IPGs are nested protection groups.

In this case, the protection switching performing unit is further configured to, under the condition that number of the multiple IPGs is two and they are respectively IPG1 and IPG2, make the IPG1 not perform protection switching when protection switching happens in the IPG2; or, make the IPG2 not perform protection switching when protection switching happens in the IPG1.

In this case, the protection switching performing unit is further configured to make the IPG1 perform protection switching, when faults occur on both a working segment and a protection segment of the IPG2, or fault occurs on other parts of member segments of the IPG1, wherein said other parts of the member segments of the IPG1 are a part of segments of the IPG1 which is not included in the IPG2.

In this case, the protection switching performing unit is further configured to construct an IPG3 to implement that there is only one IPG performing protection switching, under condition that the number of the multiple IPGs is two and they are respectively IPG1 and IPG2, wherein constructing the IPG3 comprises: using working segments of the IPG1 and working segments of the IPG2 as working segments of the IPG3, starting from a SEB of the IPG1; using the working segments of the IPG1 and protection segments of the IPG2 as a protection segment 1 of the IPG3, starting from the SEB of the IPG1; and using protection segments of the IPG1 as a protection segment 2 of the IPG3.

In one aspect, this disclosure constructs the nested protection group, namely the multiple IPGs which protect the same TESI are the nested protection group, wherein two SEPs of one IPG and the SEP or the SIP of another IPG are enabled to share the PNP. In another aspect, when the fault of TESI is detected by the multiple IPGs which protect the same TESI, only one IPG of the multiple nested IPGs performs protection switching, wherein the multiple IPGs are the nested protection group.

Compared with the related art, the multiple IPGs protect the key path such as the same TESI, and there is only one IPG of the multiple IPGs performing protection switching. Thus, adopting this disclosure can make full use of the existing network resource to focus on protecting the key path, and can greatly improve the network reliability and the ability of fault recovery.

DETAILED DESCRIPTION OF THE EMBODIMENTS

Figure 1:
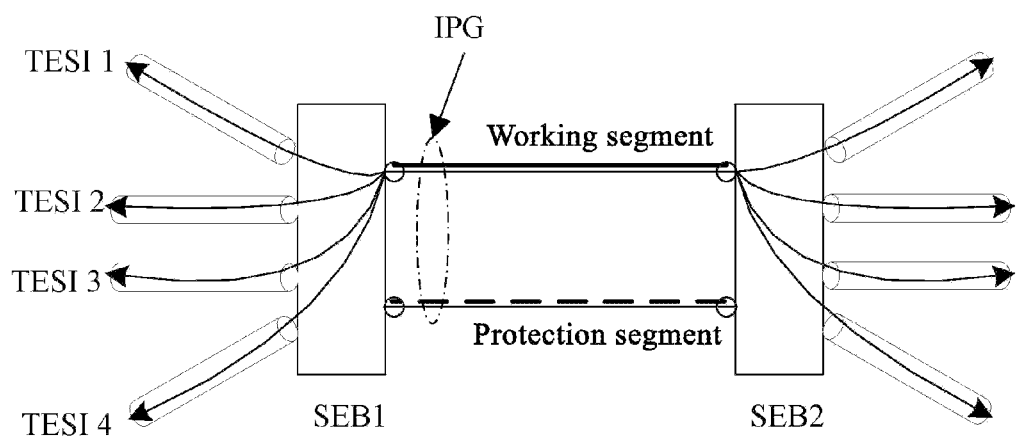
FIG. 1 shows a diagram of existing PBB-TE segment protection.
Figure 2:
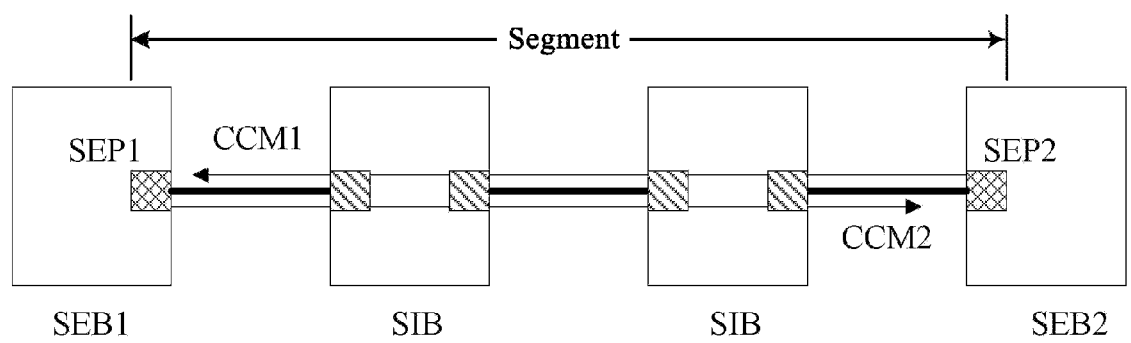
FIG. 2 shows a diagram of PBB-TE segment and its fault detecting mechanism.

The main idea of this disclosure is that: in one aspect, the multiple IPGs which protect the same TESI are nested protection groups, wherein two SEPs of one IPG and the SEP or the SIP of another IPG are enabled to share the same PNP. In another aspect, when the fault of TESI is detected by multiple IPGs which protect the same TESI, only one IPG of the multiple nested IPGs performs protection switching, wherein the multiple IPGs are nested protection groups.

Implementation of the technical solutions is described below in detail with reference to the drawings.

A method for implementing protection group overlay is provided, which comprises: using the multiple IPGs which protect the same TESI as nested protection groups.

Here, the method further comprises: enabling two SEPs of one IPG and the SEP or the SIP of another IPG to share the PNP.

A method for Ethernet protection switching based on the protection group overlay is provided, which comprises: when multiple IPGs which protect the same TESI detect the fault of the TESI, only one IPG of the multiple nested IPGs performing protection switching, wherein the multiple IPGs are nested protection groups.

Here, there are nested part existing among multiple IPGs which protect the same TESI; and the multiple IPGs are nested protection groups.

Here, when the number of multiple IPGs is two, they are called IPG1 and IPG2, respectively. In this case, only one IPG performing protection switching specifically comprises that: when protection switching happens in the IPG2, the IPG1 does not perform protection switching; or, when protection switching happens in the IPG1, the IPG2 does not perform protection switching.

Here, only one IPG performing protection switching further comprises that: when faults occur on both the working segment and the protection segment in the IPG2, or fault occurs on other parts of the member segments in the IPG1, the IPG1 performs protection switching, wherein the other parts of the member segments in the IPG1 are a part of segments in the IPG1 which is not included in the IPG2.

Here, when the number of multiple IPGs is two, they are called IPG1 and IPG2, respectively. In this case, only one IPG performing protection switching specifically comprises: constructing an IPG3 to implement that there is only one IPG performing protection switching, wherein constructing the IPG3 specifically comprises: using working segments of the IPG1 and working segments of the IPG2 as working segments of the IPG3, starting from a segment edge bridge (SEB) of the IPG1; using the working segments of the IPG1 and protection segments of the IPG2 as a protection segment 1 of the IPG3, starting from the SEB of the IPG1; and using protection segments of the IPG1 as a protection segment 2 of the IPG3.

Given the above, this disclosure mainly protects the key path through the protection group overlay, thereby increasing the utilization rate of network resource and improving the reliability of network resource. The architecture and implementation method of the protection group overlay introduced in implementation of protection switching of this disclosure are described below.

Figure 3:
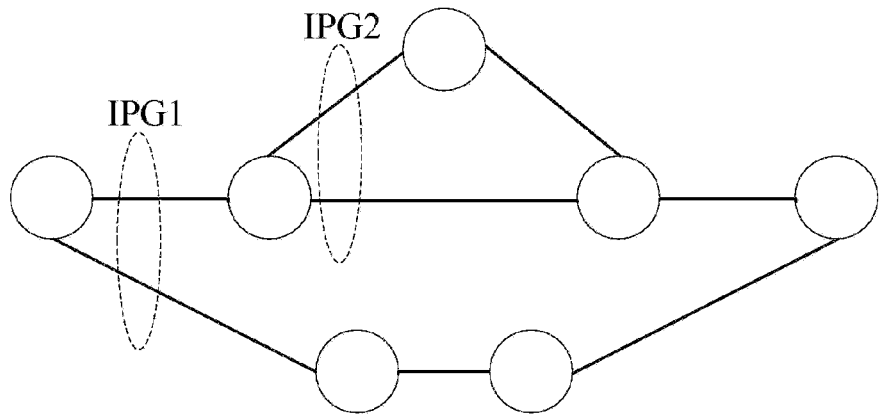
FIG. 3 shows a network topology diagram of related protection group.
Figure 4:
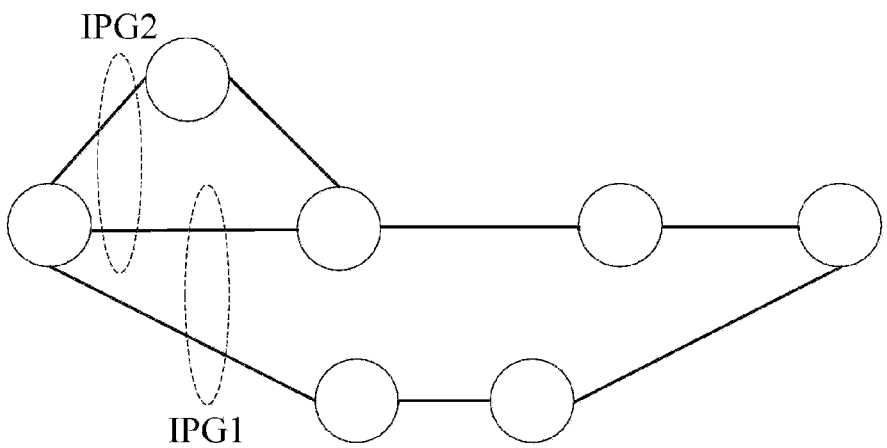
FIG. 4 shows a network topology diagram of protection group superposition of this disclosure.
Figure 5:
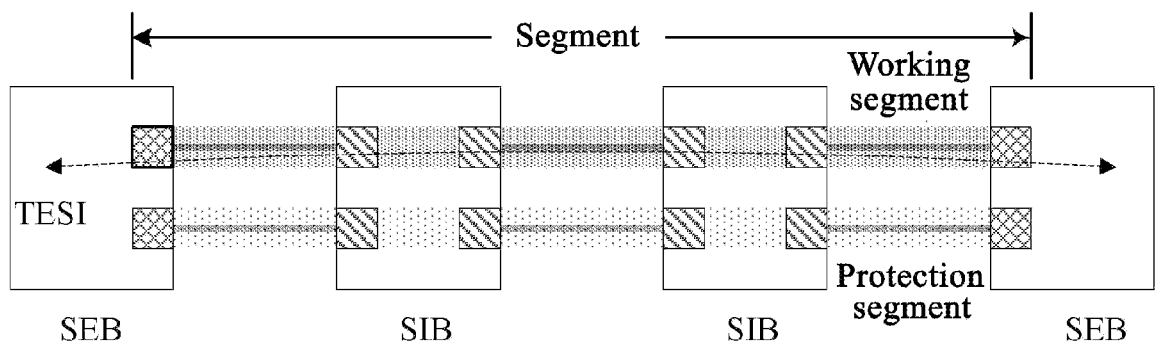
FIG. 5 shows a diagram of existing concepts, such as PBB-TE working segment, protection segment, SEB, and SIB.

FIG. 3 shows a network topology diagram of related protection group, and FIG. 4 shows a network topology diagram of protection group superposition of this disclosure. It can be shown by comparing FIG. 4 with FIG. 3 that the two protection groups in FIG. 4 protect the same group of TESIs, and this segment of TESI is above-mentioned key path.

The so-called protection group overlay means that a part of a certain protection group IPG1 and a part of another protection group IPG2 are nested, and the specific topology is shown in FIG. 4. That is, a certain segment of the IPG2 and a part of a certain segment of the IPG1 are superposed.

Here, both the IPG1 and the IPG2 can be either the protection group of 1:1 or the protection group of M:1.

Here, the nested protection group means a set of protection groups with a certain associated relationship, namely, multiple nested protection groups protect the same group of TESIs. Thus, the nested protection groups are required to ensure coordination of switching when protection switching happens. Such coordination means that: when the nested protection groups protect the same group of TESIs, if link fault occurs at this group of TESIs, then each protection group can detect the link fault. But there is only one protection group performing protection switching at present, and the other protection groups do not perform protection switching. For example, for the IPG1 and the IPG2 shown in FIG. 4, supposing when the IPG2 performs switching, the IPG1 is expected not to perform switching. The IPG1 traffic switching happens only when faults occur on both the working segment and the protection segment in the IPG2, or fault occurs on the other parts of the member segments in the IPG1, wherein the other parts of the member segments in the IPG1 are the part which is not included in the IPG2, namely the other parts, which is not superposed with the IPG2, in the Ethernet path protected by the IPG1.

The above description mainly aims at the architecture of protection group overlay. The following description mainly aims at the method for implementing Ethernet protection switching based on the protection group overlay.

For implementing the architecture of protection group overlay, this disclosure provides a method for implementing that the protection group overlay protects the same group of TESIs. As shown in FIG. 4, for enabling the IPG1 and the IPG2 to protect the same group of TESIs, it is needed to introduce a new protection group IPG3 on the basis of the original IPG1 and IPG2. Introducing the IPG3 is to ensure coordination of protection switching when the nested protection groups IPG1 and IPG2 protect the same group of TESIs, and the nested IPG1 and IPG2 perform protection switching. It should be noted that the introduced IPG3 takes the place of the IPG1, and then the fault detection and protection switching are performed by the IPG2 and the IPG3.

Specifically, a new protection group IPG3 is constructed by redefining the working segment and the protection segment between the two endpoints SEB of the original IPG1. Starting from the SEB of the IPG1, the segment, which includes a segment through the working segment of the IPG1 and a segment through the working segment of the IPG2, is used as working segment of the IPG3; Starting from the SEB of the IPG1, the segment, which includes a segment through the working segment of the IPG1 and a segment through the protection segment of the IPG2, is used as protection segment 1 of the IPG3; and the protection segment of the IPG1 is used as protection segment 2 of the IPG3. In this case, the priority of the protection segment 1 is higher than the priority of the protection segment 2, that is, traffic is switched to the protection segment 1 preferentially when the protection switching happens. Each segment of the working segment and the protection segment of the IPG3 is respectively configured with Maintenance Association (MA) to detect Connectivity Check Message (CCM). It should be noted that actually, after the IPG3 is configured, once both of the two protection groups IPG2 and IPG3 detect fault, they switch at the same time. But when the IPG3 performs switching to the protection segment 1, only because the corresponding egress ports of the protection segment 1 and the working segment are the same, traffic is still forwarded on the working segment, from the point of view of the IPG1. That is, the IPG1 does not perform switching and only the IPG2 performs switching. Thus, it is implemented that only one IPG performs protection switching when a certain fault is detected.

The IPG2 respectively configures MA on its own working segment and protection segment, and configures CCM to detect fault.

When it is needed to perform traffic switching, the IPG2 and the IPG3 independently perform protection switching by respectively detecting the working segment and protection segment in their own group.

This disclosure is illustrated below with specific examples.

EXAMPLE 1

Figure 6:
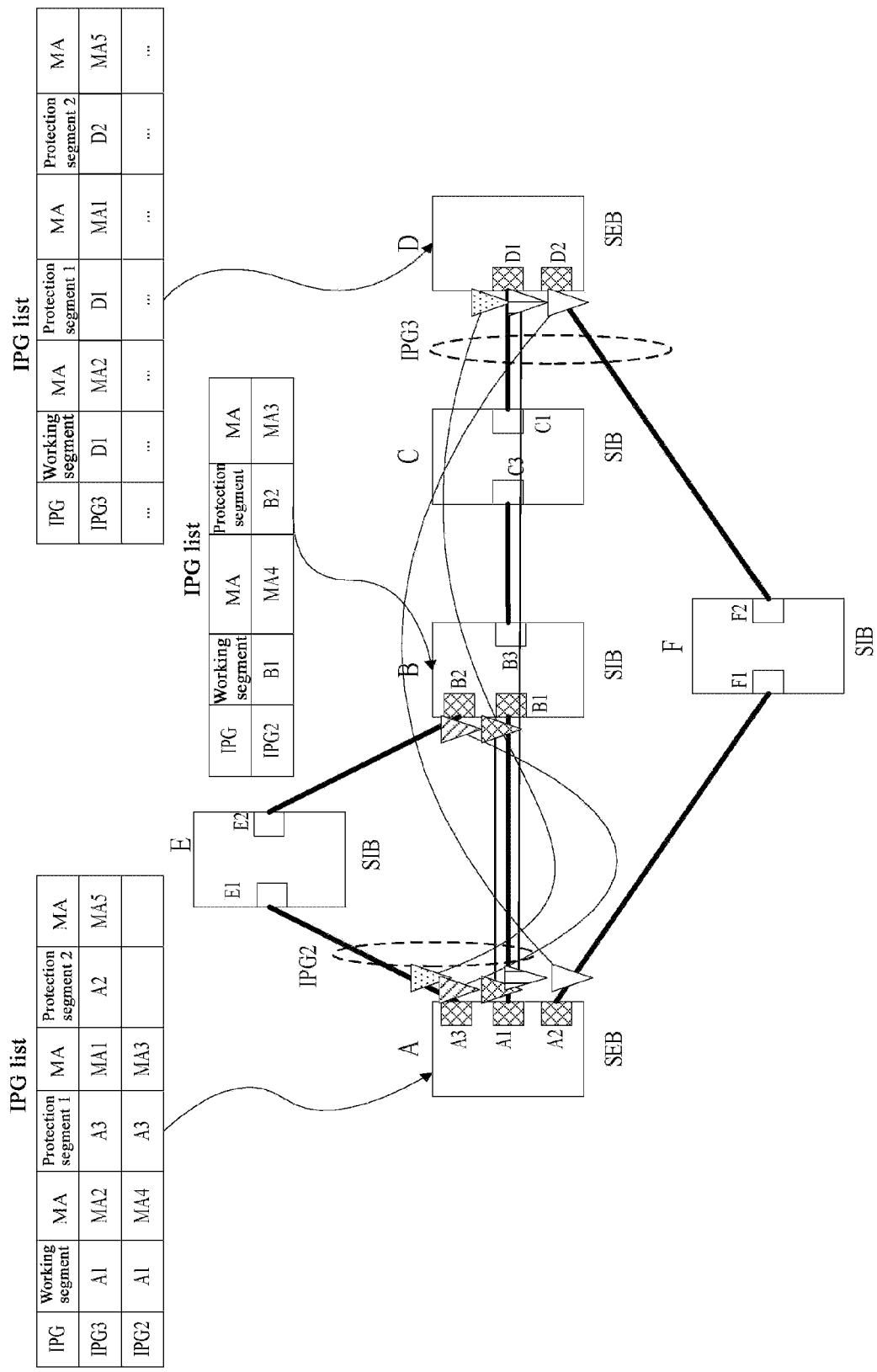
FIG. 6 shows a diagram of Example 1 of this disclosure.

As shown in FIG. 6, in the PBB-TE network, bridge devices A, B, C, D, E and F and links among them compose a set of protection groups, wherein, {A-B-C-D, A-F-D} forms the IPG1, and {A-B, A-E-B} forms the IPG2. The IPG2 is a working segment overlay nested with the IPG1. However, the solution of this disclosure can be applied not only to the situation that the IPG2 is nested on the working segment of the IPG1, but also to the situation that the IPG2 is nested on the protection segment of the IPG1, that is, A-B-C-D in FIG. 6 can be either the working segment of the IPG1, or the protection segment of the IPG1.

Herein, in Example 1, the situation that the IPG2 is nested on the working segment of the IPG1 is taken as the example. For example, the working segment A-B-C-D and the protection segment A-F-D which protects the working segment compose the protection group IPG1; and the working segment A-B and the protection segment A-E-B which protects the working segment compose the protection group IPG2. In this case, the IPG1 and the IPG2 share the same SEB at one end. As shown in FIG. 6, the IPG1 and the IPG2 share the bridge A. In addition, the IPG1 and the IPG2 can also be the PBB-TE segment protection of M:1 without being limited to the PBB-TE segment protection of 1:1. As shown in FIG. 6, this example is described with the case of 1:1.

The operation process between the IPG1 and the IPG2 is that: when fault occurs on the working segment A-B, the IPG2 performs switching to switch the incoming traffic to the protection segment A-E-B. Only when faults occur on both the working segment and the protection segment of the IPG2, or fault occurs on the segment B-C-D (including nodes B and C), the IPG1 performs switching to switch the incoming traffic to the protection segment A-F-D.

For implementing the protection function, it is needed to perform connectivity check first; the connectivity check comprises the following contents.

1. As shown in FIG. 6, 5 different MAs are configured to check connectivity of different paths respectively:

MA1: A and D at two ends of the MA1 send CCM message to the opposite end according to A-E-B-C-D to perform connectivity check;

MA2: A and D at two ends of the MA2 send CCM message to the opposite end according to A-B-C-D to perform connectivity check;

MA3: A and B at two ends of the MA3 send CCM message to the opposite end according to A-E-B to perform connectivity check;

MA4: A and B at two ends of the MA4 send CCM message to the opposite end according to A-B to perform connectivity check; and MA5: A and D at two ends of the MA5 send CCM message to the opposite end according to A-F-D to perform connectivity check.

2. Here, it takes segment A-B-C-D as working segment of a new protection group IPG3, takes segment A-E-B-C-D as protection segment 1 of the IPG3, and takes segment A-F-D as protection segment 2 of the IPG3. The priority p1 of the protection segment 1 is higher than the priority p2 of the protection segment 2 (p1 is less than p2). That is, the IPG3 is a protection group of M:1 (M is equal to 2 in this example). The working segment of the IPG2 is still A-B, and its protection segment is A-E-B. Each different segment uses its corresponding MA to detect fault.

Thus, when fault occurs on segment A-B, both the MA2 and the MA4 detect fault occurring. Both the IPG3 and the IPG2 sense fault occurring on their respective working segments, so that both of the IPG3 and the IPG2 perform protection switching. For the IPG2, fault occurring on the working segment is detected, so it performs protection switching to switch traffic to its protection segment A-E-B. That is, for A and B at its two endpoints SEB, the protection switching is implemented by modifying the egress port of item in the forwarding table corresponding to the TESI protected by the protection group to the egress port corresponding to its protection segment; for A, the egress port is modified to the egress port A3 corresponding to its protection segment; and for B, the egress port is modified to the egress port B2 corresponding to its protection segment. For IPG3, fault occurring on the working segment is detected, so it performs protection switching to switch traffic to the protection segment 1 with higher priority, namely A-E-B-C-D. For A and D at its two endpoints SEB, the protection switching is implemented by modifying the egress port of item in the forwarding table corresponding to the TESI protected by the protection group to the egress port corresponding to its protection segment; for A, the egress port is also modified to the egress port A3 corresponding to the protection segment 1; and for D, since the egress ports of the working segment and the protection segment 1 on D are the same D1, so the protection switching has happened for D, but the egress port of traffic is not changed. Thus, from the point of view of the IPG1, the protection switching has not happened.

While, under the condition that faults occur on both A-E-B and A-B, or fault occurs on B-C, or fault occurs on C-D, the IPG3 detects that faults occur on both the working segment and the protection segment 1, and then traffic is switched to the protection segment 2 which has lower priority but is still in normal operation. That is, node A modifies the egress port of item in the forwarding table corresponding to the protected TESI to A2; the node D modifies the egress port of item in the forwarding table corresponding to the protected TESI to D2. Thus, it is implemented that the IPG1 performs protection switching when the IPG2 cannot implement protection.

In FIG. 6,  represents SEP, □ represents SIP, and both the SEP and the SIP are PNP; □ represents bridge; two endpoints SEB of segment can specifically be the BEB or the BCB; the SIB in the middle of the segment can specifically be BCB;  represents CCM of the MA1;  represents CCM of the MA2;  represents CCM of the MA3;  represents CCM of the MA 4;  and  represents CCM of the MA5.

EXAMPLE 2

Figure 7:
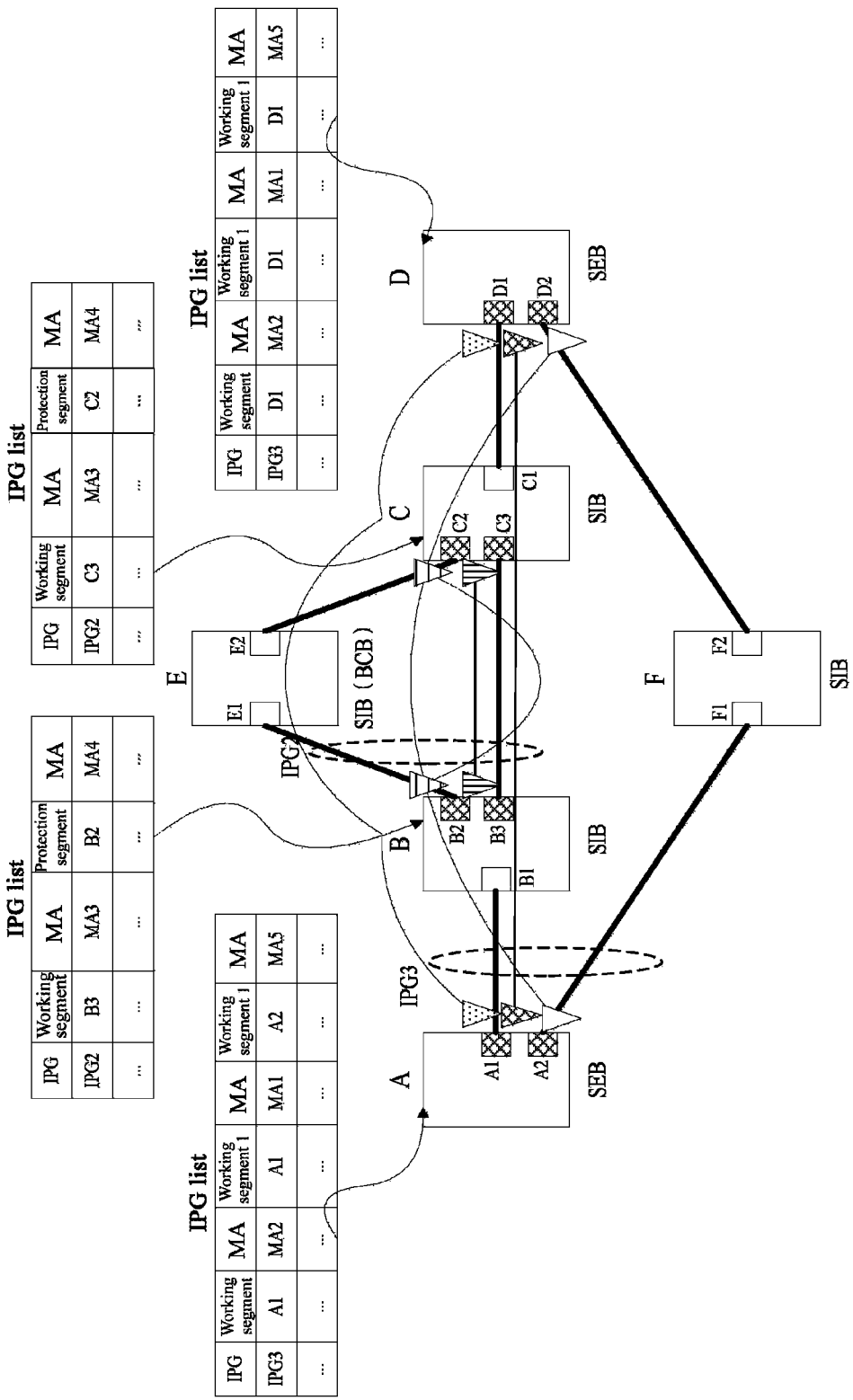
FIG. 7 shows a diagram of Example 2 of this disclosure.

As shown in FIG. 7, in the PBB-TE network, bridge devices A, B, C, D, E and F and links among them compose a set of protection groups, wherein, {A-B-C-D, A-F-D} forms the IPG1, and {B-C, B-E-C} forms the IPG2. The IPG2 is working segment overlay nested with the IPG1. However, the solution of this disclosure can be applied not only to the situation that the IPG2 is nested on the working segment of the IPG1, but also to the situation that the IPG2 can be nested on the protection segment of the IPG1. That is, segment A-B-C-D in FIG. 7 can be either the working segment of the IPG1 or the protection segment of the IPG1.

Here, in Example 2, for example, the IPG2 is nested on the working segment of the IPG1. For example, the working segment A-B-C-D and the protection segment A-F-D which protects the working segment compose the protection group IPG1; and the working segment B-C and the protection segment B-E-C which protects the working segment compose the protection group IPG2. In this case, the IPG1 and the IPG2 do not have common node on the endpoints SEB of two ends. In addition, the IPG1 and the IPG2 can also be the PBB-TE segment protection of M:1 without being limited to the PBB-TE segment protection of 1:1. As shown in FIG. 7, this example is described with case of 1:1.

The operation process between the IPG1 and the IPG2 is that: when fault occurs on the working segment B-C, the IPG2 performs switching to switch the incoming traffic to the protection segment B-E-C. Only when faults occur on both the working segment and the protection segment in the IPG2, or faults occur on the segment A-B (including node B) and the segment C-D (including node C), the IPG1 performs switching to switch the incoming traffic to the protection segment A-F-D.

For implementing the protection function, it is needed to perform connectivity check first. The connectivity check comprises the following contents.

1. As shown in FIG. 7, 5 different MAs are configured to check connectivity of different paths respectively:

MA1: A and D at two ends of the MA1 send CCM message to the opposite end according to A-B-E-C-D to perform connectivity check;

MA2: A and D at two ends of the MA2 send CCM message to the opposite end according to A-B-C-D to perform connectivity check;

MA3: B and C at two ends of the MA3 send CCM message to the opposite end according to B-E-C to perform connectivity check;

MA4: B and C at two ends of the MA4 send CCM message to the opposite end according to B-C to perform connectivity check; and MA5: A and D at two ends of the MA5 send CCM message to the opposite end according to A-F-D to perform connectivity check.

2. Here, it takes segment A-B-C-D as working segment of a new protection group IPG3, takes segment A-B-E-C-D as protection segment 1 of the IPG3, and takes segment A-F-D as protection segment 2 of the IPG3, wherein the priority p1 of the protection segment 1 is higher than the priority p2 of the protection segment 2 (p1 is less than p2), that is, the IPG3 is a protection group of M:1 (M is equal to 2 in this embodiment). The working segment of the IPG2 is still B-C, and its protection segment is B-E-C. Each different segment uses its corresponding MA to detect fault.

Thus, when fault occurs on segment B-C, both the MA2 and the MA4 detect fault occurring, and both the IPG3 and the IPG2 sense fault occurring on their respective working segments, so that both of the IPG3 and the IPG2 perform protection switching. For the IPG2, since fault occurring on the working segment is detected, so it performs protection switching to switch traffic to its protection segment B-E-C. That is, for B and C at its two endpoints SEB, if fault occurring on the working segment of its protection group is detected, then traffic is needed to be switched to the protection segment. The protection switching is implemented by modifying the egress port of item in the forwarding table corresponding to the TESI protected by the protection group to the egress port corresponding to their protection segments; for B, the egress port corresponding to its protection segment is still B2; and for C, the egress port corresponding to its protection segment is still C2. For the IPG3, fault occurring on the working segment is detected, so it also performs protection switching to switch traffic to the protection segment 1 with higher priority, namely A-B-E-C-D. For A and D at its two endpoints SEB, the protection switching is implemented by modifying the egress port of item in the forwarding table corresponding to the TESI protected by the protection group to the egress port corresponding to their protection segments; for A, the egress ports of the working segment and the protection segment 1 on A are the same A1; and for D, the egress ports of the working segment and the protection segment 1 on D are the same D1. Thus, the protection switching has happened for both A and D, but the egress port of traffic is not changed. Therefore, from the point of view of the IPG1, the protection switching has not happened.

Under the condition that faults occur on both B-E-C and B-C, or fault occurs on A-B, or fault occurs on C-D, the IPG3 detects that faults occur on both the working segment and the protection segment 1, and then traffic is switched to the protection segment 2 which has lower priority but is still in normal operation. That is, the node A modifies the egress port of item in the forwarding table corresponding to the protected TESI to A2; and the node D modifies the egress port of item in the forwarding table corresponding to the protected TESI to D2. Thus, it is implemented that the IPG1 performs protection switching when the IPG2 cannot implement protection.

In FIG. 7, ▧ represents SEP, □ represents SIP, and both the SEP and the SIP are PNP; □ represents bridge; two endpoints SEB of segment can specifically be the BEB or the BCB; the SIB in the middle of the segment can specifically be BCB; ▽—▽ represents CCM of the MA1; ▽—▽ represents CCM of the MA2; ▽—▽ represents CCM of the MA3; ▽—▽ represents CCM of the MA 4; and ▽—▽ represents CCM of the MA5.

A system for implementing Ethernet protection switching based on the protection group overlay is provided, which comprises: a protection switching performing unit, configured to make only one IPG of the multiple nested IPGs perform protection switching, when a fault of a TESI is detected by multiple IPGs which protect the same TESI, wherein the multiple IPGs are nested protection groups.

Here, the protection switching performing unit is further configured to make the IPG1 not perform protection switching when protection switching happens in the IPG2, under the condition that number of the multiple IPGs is two and they are respectively IPG1 and IPG2; or, make the IPG2 not perform protection switching when protection switching happens in the IPG1.

Here, the protection switching performing unit is further configured to make the IPG1 perform protection switching, when faults occur on both the working segment and the protection segment in the IPG2, or fault occurs on other parts of the member segments in the IPG1, wherein the other parts of the member segments in the IPG1 are a part of segments in the IPG1 which is not included in the IPG2.

Here, the protection switching performing unit is further configured to construct an IPG3 to implement that there is only one IPG performing protection switching, under condition that the number of multiple IPGs is two and they are respectively IPG1 and IPG2, wherein constructing the IPG3 specifically comprises: using working segments of the IPG1 and working segments of the IPG2 as working segments of the IPG3, starting from a segment edge bridge (SEB) of the IPG1; using the working segments of the IPG1 and protection segments of the IPG2 as a protection segment 1 of the IPG3, starting from the SEB of the IPG1; and using protection segments along the IPG1 as a protection segment 2 of the IPG3.

The abbreviations involved in above texts and figures are described below:

SEP means the segment endpoint port, and is represented by Segment Endpoint Port;

PNP means the provider network port, and is represented by Provider Network Port;

SIP means the segment intermediate port, and is represented by Segment Intermediate Port; and MA means the maintenance association, and is represented by Maintenance Association.

The above is only preferred embodiments of this disclosure, and is not intended to limit the scope of this disclosure.

What is claimed is:

1. A method for implementing protection group overlay, comprising:

using as nested protection groups multiple infrastructure protection groups (IPG) which protect a same traffic engineering service instance (TESI), wherein the number of the multiple IPGs is two, and they are IPG1 and IPG2 respectively;

constructing an IPG3 which takes the place of the IPG1, and performing fault detection and protection switching by both the IPG2 and the IPG3 to implement that there is only one IPG performing protection switching, wherein constructing the IPG3 comprises: using a segment, which includes a segment through a working segment of the IPG1 and a segment through a working segment of the IPG2, as a working segment of the IPG3, starting from an SEB of the IPG1; using a segment, which includes a segment through the working segment of the IPG1 and a segment through a protection segment of the IPG2, as a protection segment 1 of the IPG3, starting from an SEB of the IPG1; and using a protection segment of the IPG1 as a protection segment 2 of the IPG3, wherein a priority of the protection segment 1 is higher than a priority of the protection segment 2.

2. The method according to claim 1, further comprising: enabling two segment endpoint ports (SEP) of one IPG and SEPs or a segment intermediate port (SIP) of another IPG to share a provider network port (PNP).

3. A method for implementing Ethernet protection switching based on protection group overlay, comprising:

when a fault of a TESI is detected by multiple IPGs which protect a same TESI, only one IPG of the multiple nested IPGs performing protection switching, wherein the multiple IPGs are nested protection groups, and wherein the number of the multiple IPGS is two, and they are IPG1 and IPG2 respectively;

the step of only one IPG performing protection switching comprising constructing an IPG3 which takes the place of the IPG1, and performing fault detection and protection switching by both the IPG2 and the IPG3 to implement that there is only one IPG performing protection switching, wherein constructing the IPG3 comprises: using a segment, which includes a segment through a working segment of the IPG1 and a segment through a working segment of the IPG2, as a working segment of the IPG3, starting from an SEB of the IPG1; using a segment, which includes a segment through the working segment of the IPG1 and a segment through a protection segment of the IPG2, as a protection segment 1 of the IPG3, starting from an SEB of the IPG1; and using a protection segment of the IPG1 as a protection segment 2 of the IPG3, wherein a priority of the protection segment 1 is higher than a priority of the protection segment 2.

4. The method according to claim 3, wherein the step of only one IPG performing protection switching comprises: when protection switching happens in the IPG2, the IPG1 does not perform protection switching; or, when protection switching happens in the IPG1, the IPG2 does not perform protection switching.

5. The method according to claim 4, wherein the step of only one IPG performing protection switching further comprises that: when faults occur on both a working segment and a protection segment in the IPG2, or fault occurs on other part of member segments in the IPG1, the IPG1 performs protection switching, wherein the other part of the member segments in the IPG1 is a part of segments in the IPG1 which is not included in the IPG2.

6. A system for implementing Ethernet protection switching based on protection group overlay, comprising: a protection switching performing unit, configured to make only one IPG of the multiple nested IPGs perform protection switching when multiple IPGs which protect a same TESI detect a fault of the TESI, wherein:

the multiple IPGs are nested protection groups, and when the number of the multiple IPGs is two, they are IPG1 and IPG2 respectively, the protection switching performing unit is further configured to construct an IPG3 which takes the place of the IPG1, wherein fault detection and protection switching is performed by both the IPG2 and the IPG3 to implement that there is only one IPG performing protection switching, constructing the IPG3 comprises: using a segment, which includes a segment through a working segment of the IPG1 and a segment through a working segment of the IPG2, as a working segment of the IPG3, starting from an SEB of the IPG1; using a segment, which includes a segment through the working segment of the IPG1 and a segment through a protection segment of the IPG2, as a protection segment 1 of the IPG3, starting from an SEB of the IPG1; and using a protection segment of the IPG1 as a protection segment 2 of the IPG3, wherein a priority of the protection segment 1 is higher than a priority of the protection segment 2.

7. The system according to claim 6, wherein the protection switching performing unit is further configured to make the IPG1 not perform protection switching, under the condition that the number of the multiple IPGs is two and they are respectively IPG1 and IPG2, when protection switching happens in the IPG2; or, make the IPG2 not perform protection switching when protection switching happens in the IPG1.

8. The system according to claim 7, wherein the protection switching performing unit is further configured to make the IPG1 perform protection switching, when faults occur on both a working segment and a protection segment of the IPG2, or fault occurs on other parts of member segments of the IPG1, wherein said other parts of the member segments of the IPG1 are a part of segments of the IPG1 which is not included in the IPG2.

* * * * *